(12) United States Patent
Nakamura et al.

(10) Patent No.: US 6,553,221 B2
(45) Date of Patent: *Apr. 22, 2003

(54) INCOMING CALL NOTIFICATION APPARATUS

(75) Inventors: Masayuki Nakamura, Fukuoka (JP); Atsushi Tsukazoe, Fukuoka (JP); Tadashi Iwahashi, Fukuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,734

(22) Filed: Nov. 17, 1998

(65) Prior Publication Data

US 2001/0044307 A1 Nov. 22, 2001

(30) Foreign Application Priority Data

Jun. 4, 1998 (JP) ............................................. 10-155493

(51) Int. Cl.⁷ .................................................. H04M 3/42
(52) U.S. Cl. ..................... 455/415; 455/413; 455/417; 455/528; 379/215.01; 379/142.08
(58) Field of Search ................................. 455/412, 413, 455/414, 415, 417, 567, 461, 421, 458, 466, 528, 445; 379/142.04, 142.08, 210.01, 88.12, 215.01

(56) References Cited

U.S. PATENT DOCUMENTS

| | | | |
|---|---|---|---|
| 4,172,969 A | * 10/1979 | Levine et al. | 379/70 |
| 4,661,972 A | * 4/1987 | Kai | 455/31.2 |
| 4,932,042 A | * 6/1990 | Baral et al. | 379/67 |
| 4,941,203 A | * 7/1990 | Patsiokas et al. | 455/517 |
| 4,942,598 A | * 7/1990 | Davis | 455/31.2 |
| 5,105,458 A | * 4/1992 | Takenaka | 455/412 |
| 5,109,400 A | * 4/1992 | Patsiokas et al. | 455/413 |
| 5,151,929 A | * 9/1992 | Wolf | 455/31.2 |
| 5,177,780 A | * 1/1993 | Kasper et al. | 455/413 |
| 5,313,515 A | * 5/1994 | Allen et al. | 455/413 |
| 5,410,539 A | * 4/1995 | Ikeno | 370/385 |
| 5,418,835 A | * 5/1995 | Frohman et al. | 455/413 |
| 5,506,888 A | * 4/1996 | Hayes et al. | 455/445 |
| 5,513,242 A | * 4/1996 | Mukerjee et al. | 455/403 |
| 5,657,372 A | * 8/1997 | Ahlberg et al. | 455/414 |

(List continued on next page.)

FOREIGN PATENT DOCUMENTS

| | | |
|---|---|---|
| EP | 0481683 | * 10/1991 |
| EP | 0699009 | * 2/1996 |
| JP | 64-294365 | 12/1987 |
| JP | 03-007459 | 1/1991 |
| JP | 06-165247 | 6/1994 |
| JP | 09-307962 | 11/1997 |
| WO | 92/14330 | * 8/1992 |
| WO | 96/25817 | * 8/1996 |

*Primary Examiner*—Charles N. Appiah
(74) *Attorney, Agent, or Firm*—Katten Muchin Zavis Rosenman

(57) ABSTRACT

An incoming call notification apparatus which is capable of notifying an operator of a called terminal of an incoming call received when the terminal was not capable of answering an incoming call. When a terminal calls another terminal which is in use or in communication with still another terminal, an incoming call information storage apparatus stores incoming call information of the incoming call. When the called terminal becomes capable of accepting a call, a call setup message transmission apparatus reads out the stored incoming call information, produces a call setup message containing the incoming call information, and then transmits the call setup message to the called terminal. A disconnect apparatus executes incoming call abortion processing after completion of a calling (ALERT) sequence carried out in response to the call setup message during the incoming call processing.

16 Claims, 15 Drawing Sheets

U.S. PATENT DOCUMENTS

| | | | | |
|---|---|---|---|---|
| 5,703,570 A | * | 12/1997 | Gorday et al. | 340/825.44 |
| 5,703,934 A | * | 12/1997 | Zicker et al. | 379/142 |
| 5,722,071 A | * | 2/1998 | Berg et al. | 455/426 |
| 5,754,627 A | * | 5/1998 | Butler et al. | 455/414 |
| 5,761,277 A | * | 6/1998 | Foladare et al. | 379/88.22 |
| 5,784,438 A | * | 7/1998 | Martinez | 379/67.1 |
| 5,802,466 A | * | 9/1998 | Gallant et al. | 455/413 |
| 5,809,128 A | * | 9/1998 | McMullin | 379/215 |
| 5,819,174 A | * | 10/1998 | Kyllonen | 455/414 |
| 5,884,160 A | * | 3/1999 | Kanazaki | 455/413 |
| 5,933,487 A | * | 8/1999 | Strickland | 379/209.01 |
| 5,974,117 A | * | 10/1999 | Mahvi | 379/88.12 |
| 5,995,848 A | * | 11/1999 | Nguyen | 455/528 |
| 6,002,750 A | * | 12/1999 | Ertz | 379/88.12 |
| 6,006,087 A | * | 12/1999 | Amin | 455/413 |
| 6,014,559 A | * | 1/2000 | Amin | 455/413 |
| 6,049,713 A | * | 4/2000 | Tran et al. | 455/415 |
| 6,081,725 A | * | 6/2000 | Ishida | 455/462 |
| 6,108,532 A | * | 8/2000 | Matsuda et al. | 455/413 |
| 6,192,251 B1 | * | 2/2001 | Jyogataki et al. | 455/466 |
| 6,253,075 B1 | * | 6/2001 | Beghtol et al. | 455/415 |
| 6,393,272 B1 | * | 5/2002 | Cannon et al. | 455/413 |

* cited by examiner

| | TERMINAL STATUS |
|---|---|
| MOBILE TERMINAL 1 | CALL-NOT-ACCEPTABLE |
| MOBILE TERMINAL 2 | POWER OFF OR OUT-OF-AREA |
| ⋮ | ⋮ |
| MOBILE TERMINAL n | CALL-NOT-ACCEPTABLE |

TERMINAL STATUS STORAGE TABLE

FIG. 4

INCOMING CALL NOTIFICATION APPARATUS

BACKGROUND OF THE INVENTION

1. Field of the Invention

The present invention relates to an incoming call notification apparatus, and more particularly to an incoming call notification apparatus which makes it possible to notify a called terminal of an incoming call received when the terminal is in a call-not-acceptable state e.g. due to communication with another party.

2. Description of the Related Art

Conventionally, if a call is made to a mobile terminal but not answered, the call originator's subscriber number or the like is displayed on a display of the mobile terminal for incoming call notification, and at the same time the number is stored in a memory of the mobile terminal. This enables the operator of the mobile terminal to be informed of the receipt of the incoming call and call back to the call originator based on the information.

Conventionally, however, the incoming call notification is available only when the called mobile terminal is capable of receiving a call and at the same not in use for communication, whereas the notification is not available when the terminal is in use for communication or when the power of the terminal is in the OFF state or the terminal is outside a service area therefor. That is, when the called mobile terminal is incapable of accepting a call e.g. due to communication with another party, it is impossible to notify the mobile terminal of receipt of the call, and hence the operator of the terminal cannot be informed of receipt of the call.

SUMMARY OF THE INVENTION

It is an object of the invention to provide an incoming call notification apparatus which is capable of notifying an operator of a called terminal of receipt of an incoming call even if the incoming call is received when the called terminal is in a call-not-acceptable state.

To attain the above object, the present invention provides an incoming call notification apparatus provided within an exchange for use in a telephone system which performs communication via the exchange, comprising incoming call information storage means for storing incoming call information of an incoming call received when a called terminal is in a call-not-acceptable state, call setup message transmission means for reading out the incoming call information stored in the incoming call information storage means, producing a call setup message containing the incoming call information read out, and transmitting the call setup message to the called terminal, when the called terminal has changed from the call-not-acceptable state to a call-acceptable state, and disconnect means for carrying out incoming call abortion processing after execution of calling.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram showing an example of contents stored in a terminal status storage table;

FIG. 12 is a sequence diagram showing operations performed by the private branch exchange immediately after the power of the mobile terminal is turned on;

DESCRIPTION OF THE PREFERRED EMBODIMENTS

Preferred embodiments of the present invention will be described below with reference to accompanying drawings.

Figure 1:
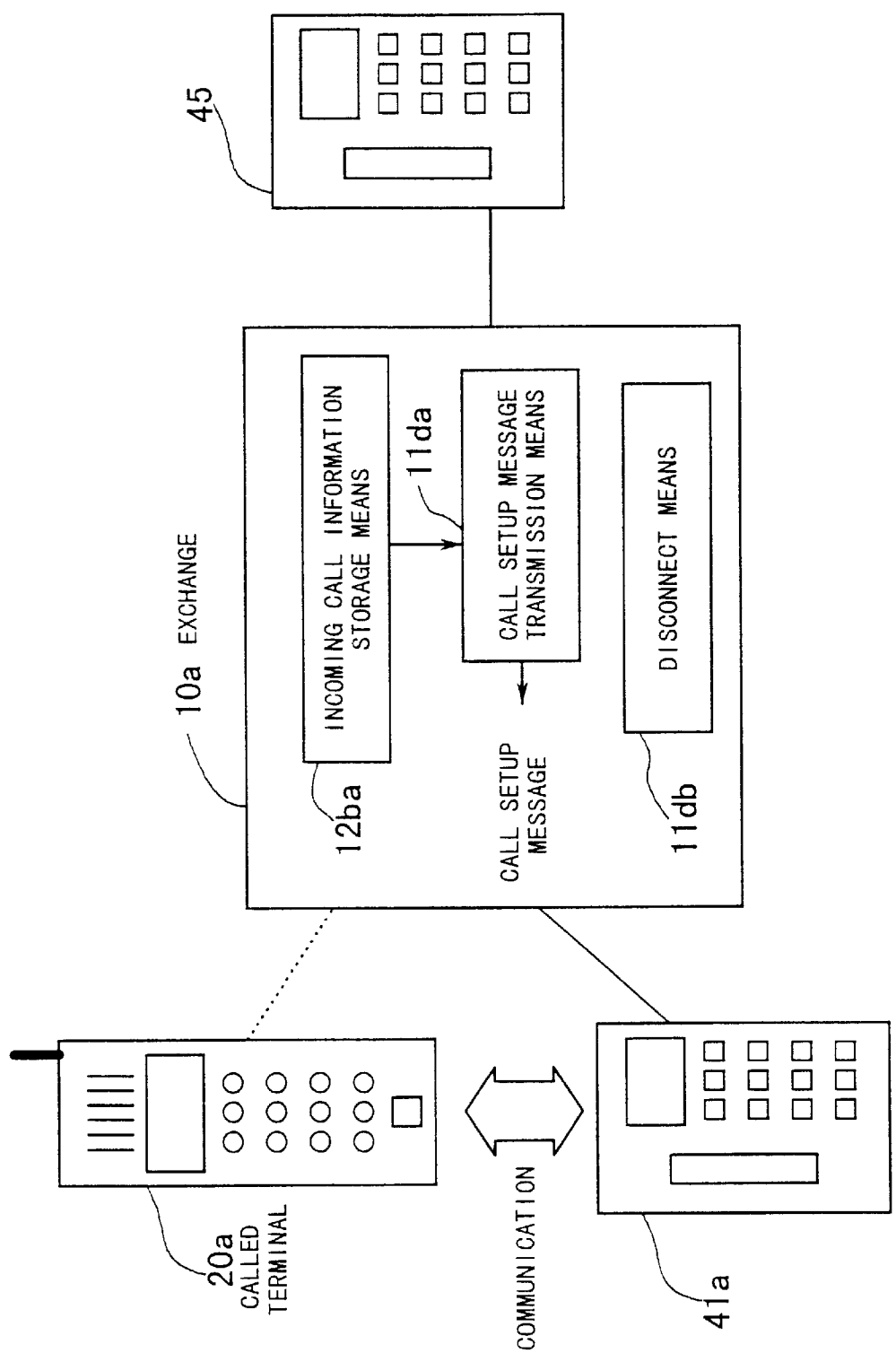
FIG. 1 is a conceptual representation of construction of the present invention.

Referring first to FIG. 1, description is made of the principles and construction of an incoming call notification apparatus according to a first embodiment of the invention. The incoming call notification apparatus includes incoming call information storage means 12ba, call setup message transmission means 11da, and disconnect means 11db. The incoming call information storage means 12ba stores information of an incoming call which an exchange 10a receives when a called terminal 20a is incapable of accepting a call. The call setup message transmission means 11da reads out incoming call information associated with the terminal 20a stored in the incoming call information storage means 12ba, when the called terminal 20a has changed from a call-not-acceptable state to a call-acceptable state, and then produces a call setup message containing the incoming call information read out, to transmit the same to the called terminal 20a. The disconnect means 11db executes incoming call abortion processing after completion of a calling (ALERT) sequence in a call setup process accompanying the transmission of the call setup message.

Between the exchange 10a constructed as above and the terminal 20a, incoming and outgoing call processes are executed according to conventional standard recommendations. For instance, in an incoming call process, series of sequences including call setup (SET UP), call setup acceptance (CALL PROC), additional information authentication request (INFO), additional information authentication response (INFO), calling (ALERT), etc. are carried out. In the call setup (SET UP) sequence, a call setup message containing a call originator's subscriber number is delivered to the called terminal 20a.

Now, let it be assumed that a terminal 45 calls the called terminal 20a during communication between the terminal 20a and a terminal 41. In this case, since the called terminal 20a is incapable of accepting a call, the incoming call information storage means 12ba within the exchange 10a stores information of the incoming call (including at least the call originator's subscriber number).

When the terminal 20a changes from a call-not-acceptable state to a call-acceptable state, the call setup message transmission means 11da reads out the incoming call information associated with the terminal 20a stored in the incoming call information storage means 12ba, and then produces a call setup message containing the incoming call information read out, to transmit the same to the terminal 20a. That is, the call setup message transmission means 11da transmits the call setup message to carry out pseudo incoming call processing, while the terminal 20a, notified of receipt of the call as usual, displays the incoming call notification and at the same time stores the incoming call information in a memory thereof.

After completion of the calling (ALERT) sequence in the incoming call process accompanying the transmission of the call setup message, the disconnect means 11db executes incoming call abortion processing. In short, since the present call delivered by the call setup message transmission means 11da is a pseudo one which does not require call establishment, the abortion processing is carried out.

Although the above description is made of a case in which the called terminal 20a was incapable of accepting a call due to communication with the terminal 41a, the operator of the terminal 20a is also notified of an incoming call which was received by the exchange 10a when the terminal 20a was incapable of receiving a call due to the OFF state of its power or due to location of the terminal 20a outside a service area therefor, immediately after the terminal 20a has changed from such a call-not-acceptable state to a call-acceptable state.

Further, since this incoming call notification can be performed through the sequences of conventional operations for the incoming call process, it is not required to change the construction of conventional terminals when the present invention is applied to a telephone system using them.

Next, the first embodiment of the present invention will be described in further detail with reference to FIG. 2. In the first embodiment described below, a private branch exchange 10 in FIG. 2 corresponds to the exchange 10a in FIG. 1, and similarly, a mobile terminal 20 in FIG. 2 to the called terminal 20a, a multi-function telephone set 41 in FIG. 2 to the terminal 41a, an incoming call information storage table 12b in FIG. 3 to the incoming call information storage means 12ba, and a pseudo incoming call control section 11d in FIG. 3 to the call setup message transmission means 11da and the disconnect means 11db.

Figure 2:
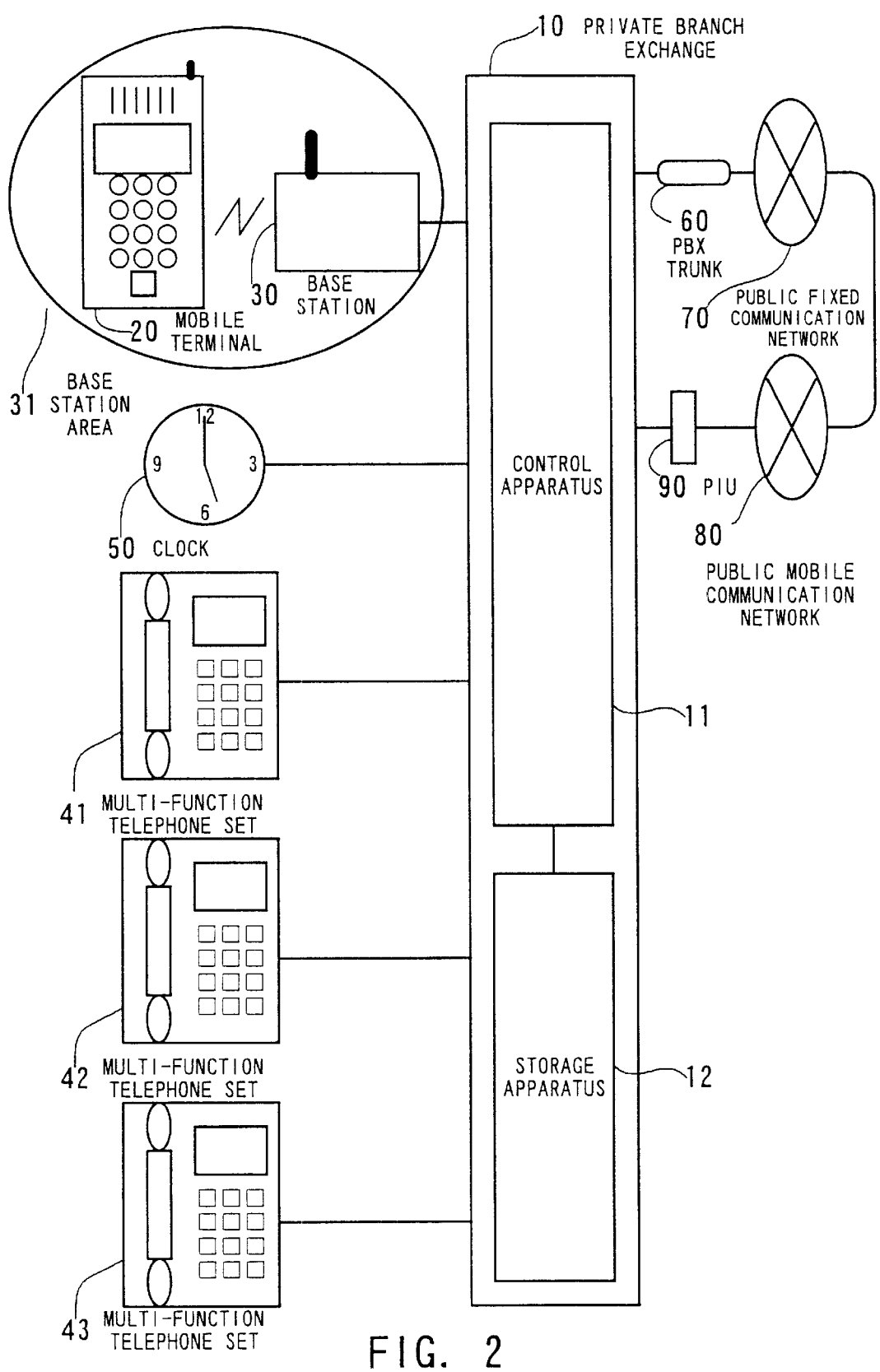
FIG. 2 is a diagram showing construction of a telephone system incorporating an incoming call notification apparatus according to a first embodiment of the present invention.

FIG. 2 shows the construction of a telephone system incorporating the incoming call notification apparatus according to the first embodiment.

The private branch exchange 10 is an exchange which performs line switching between various terminal apparatuss employed by a facility provided e.g. within an office building. Connected to the private branch exchange 10 are not only a fixed communication network but also a mobile communication network. The private branch exchange 10 includes a control apparatus 11 and a storage apparatus 12, which will be described in detail hereinafter with reference to FIG. 3.

A base station 30 having a base station area 31 as a radio service area is connected to the private branch exchange 10 for radio communication with mobile terminals whose locations are registered with the exchange 10. The mobile terminal 20 is a terminal having its location registered with the private branch exchange 10 for radio communication with the base station 30. The multi-function telephone set 41 and other multi-function telephone sets 42 and 43 are telephones for use in the fixed communication network managed by the exchange 10. A clock 50 informs the exchange 10 of the present time of day.

A PBX trunk 60 is an interface apparatus for connection between a public fixed communication network 70 and the private branch exchange 10. A PHS Interface Unit (PIU) 90 operates as a communication interface between a public mobile communication network 80 and the private branch exchange 10.

Figure 3:
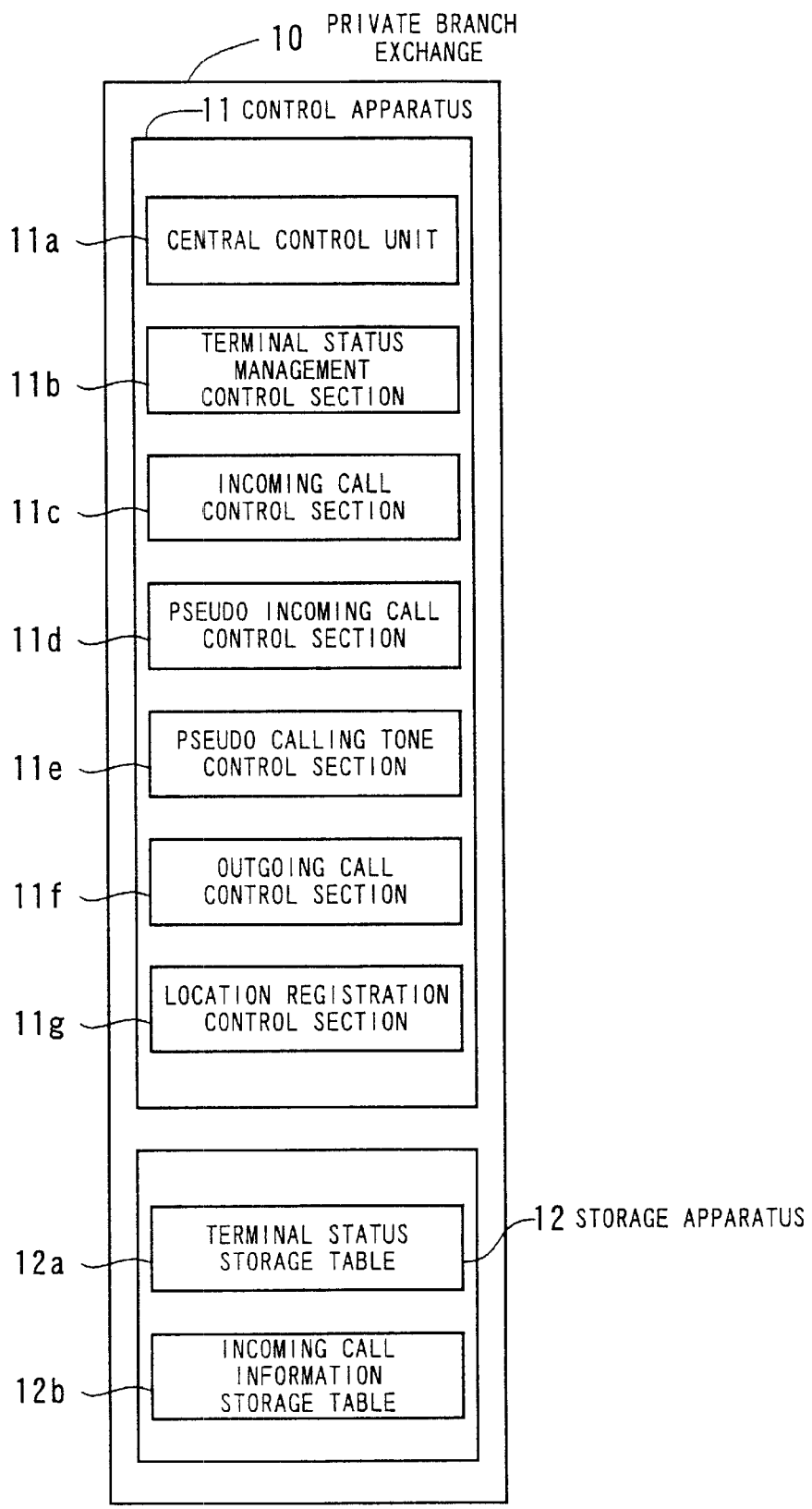
FIG. 3 is a block diagram schematically showing internal constructions of a control apparatus and a storage apparatus provided in a private branch exchange appearing in FIG. 2.

FIG. 3 shows the internal constructions of the control apparatus 11 and the storage apparatus 12 provided in the private branch exchange 10. In the control apparatus 11, a central control unit 11a controls the overall operation of the private branch exchange 10. A terminal status management control section 11b manages the status of each of all terminals connected to the private branch exchange 10. An incoming call control section 11c carries out an incoming call processss when a call to a terminal connected to the exchange 10 is received. A pseudo incoming call control section 11d controls a pseudo incoming call delivered to a mobile terminal. A pseudo calling tone control section 11e carries out ringing/vibration control accompanying a pseudo incoming call. An outgoing call control section 11f controls a call setup sequence. A location registration control section 11g controls processing for location registration concerning each mobile terminal connected to the exchange 10.

In the storage apparatus 12, a terminal status storage table 12a stores the status (call-acceptable, call-not-acceptable, power off, out-of-area, etc.) of each of the mobile terminals connected to the private branch exchange 10. FIG. 4 shows an example of contents stored the terminal status storage table 12a.

Figure 5:
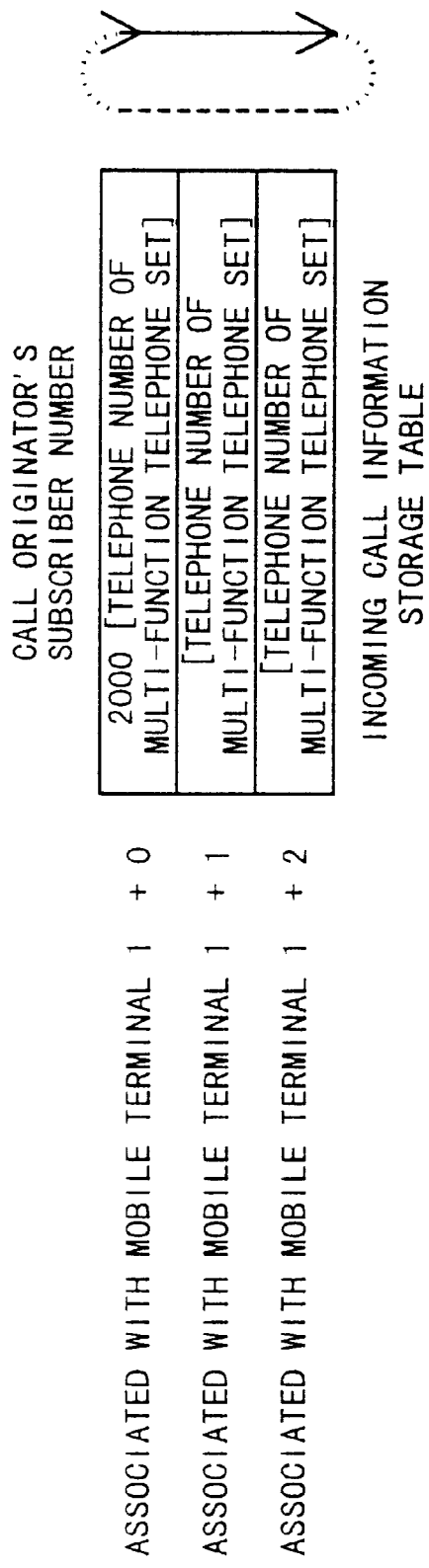
FIG. 5 is a diagram showing an example of contents stored an incoming call information storage table.

The incoming call information storage table 12b stores incoming call information (call originator's subscriber number) of an incoming call generated when a mobile terminal is incapable of accepting a call. FIG. 5 shows an example of contents stored in the incoming call information storage table 12b. The illustrated table stores three incoming call information items (three call originators' subscriber numbers) in a circulating manner for each mobile terminal (the number of records provided for each mobile terminal in the table held by the exchange is equal to the maximum number of records of a corresponding table stored in the mobile terminal).

Figure 6:
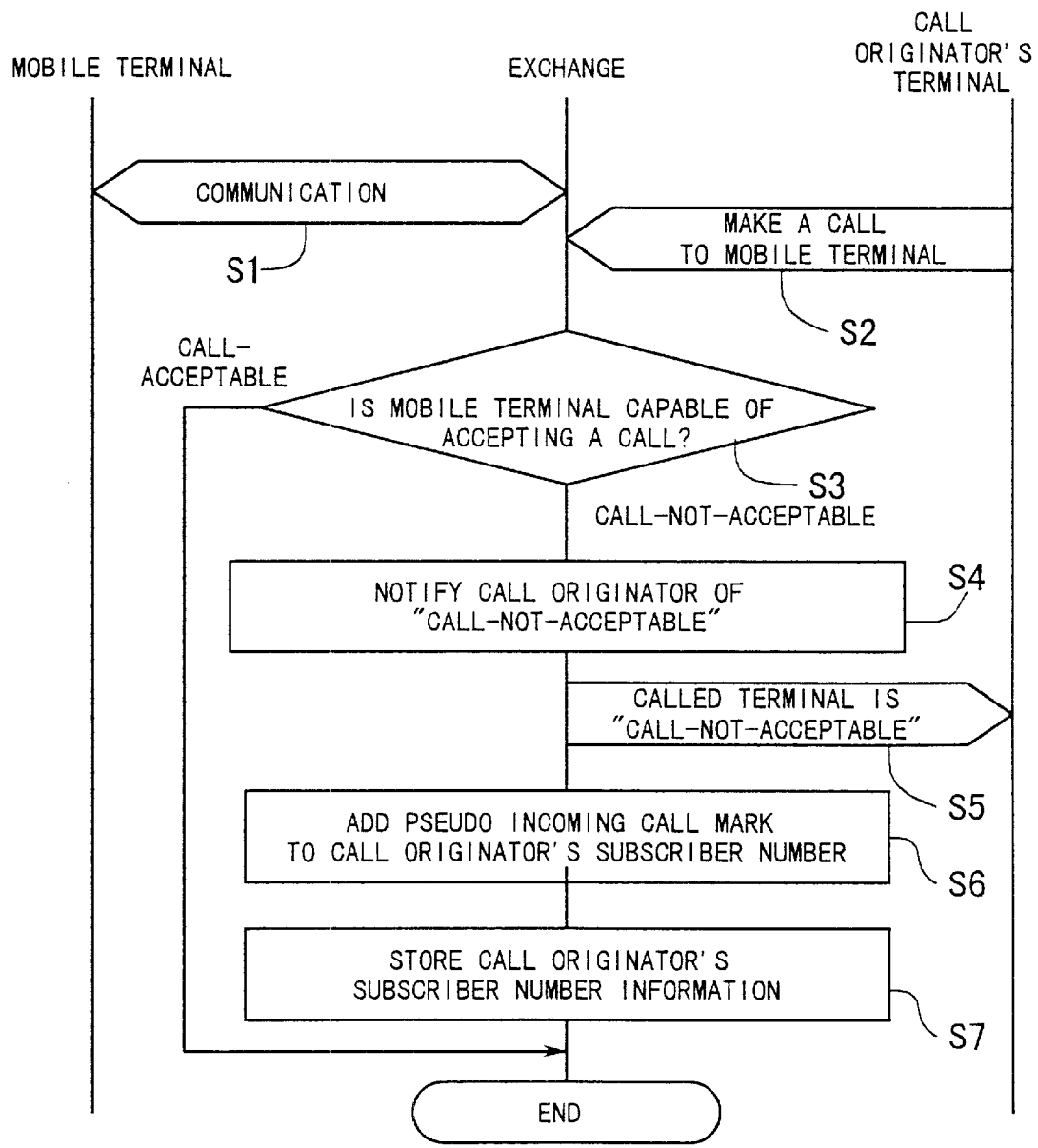
FIG. 6 is a sequence diagram showing a process for storing incoming call information of an incoming call, according to the first embodiment.

FIG. 6 shows a process for storing incoming call information of an incoming call, according to the first embodiment.

In this example, description will be made of a case in which when the mobile terminal 20 is during communication or in use (S1), the multi-function telephone set 41 (telephone number 2000) calls the terminal 20 (S2). In FIG. 6, the mobile terminal 20 is simply represented as "MOBILE TERMINAL", and the multi-function telephone set 41 as "CALL ORIGINATOR'S TERMINAL".

When the private branch exchange 10 receives the call to the mobile terminal 20 made by the multi-function telephone set (calling party's terminal) 41, the incoming call control section 11c searches the terminal status storage table 12a storing status information of the called mobile terminal 20, to determine whether or not the mobile terminal 20 is in a call-acceptable state (S3). In the present case, since the terminal 20 is incapable of accepting a call due to communication with another party, the multi-function telephone set 41 is notified that the terminal 20 is in a "call-not-acceptable" state (S5).

The pseudo incoming call control section 11d puts a pseudo incoming call mark "*" indicative of falseness of a pseudo incoming call before the first digit of the call originator's subscriber number (2000) (S6). Then, the incoming call control section 11c stores the incoming call information (* 2000) of the incoming call in the incoming call information storage table 12b (S7).

Figure 7:
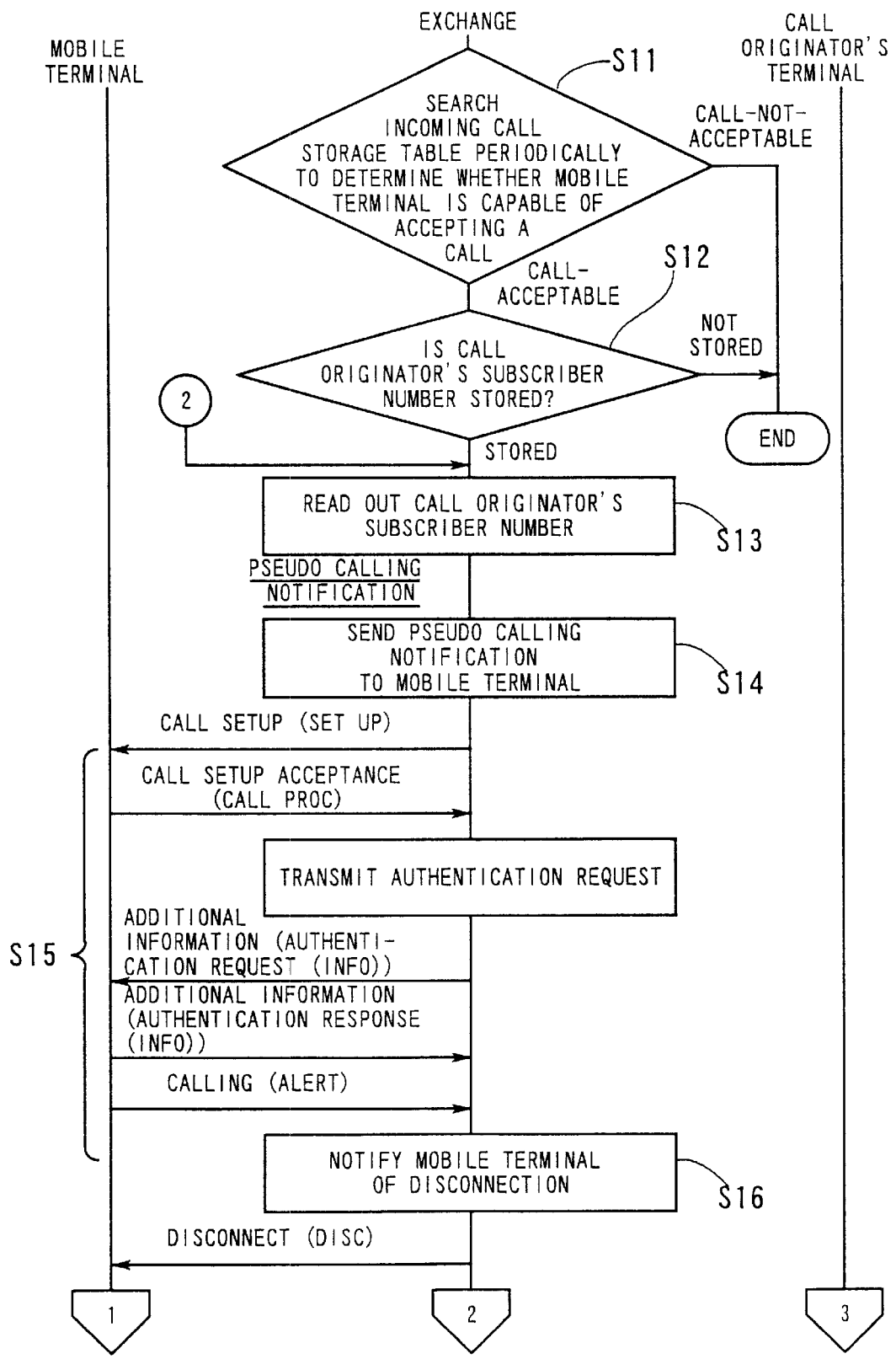
FIG. 7 is a sequence diagram showing a first half of a process for pseudo calling notification and pseudo calling tone notification, according to the first embodiment.
Figure 8:
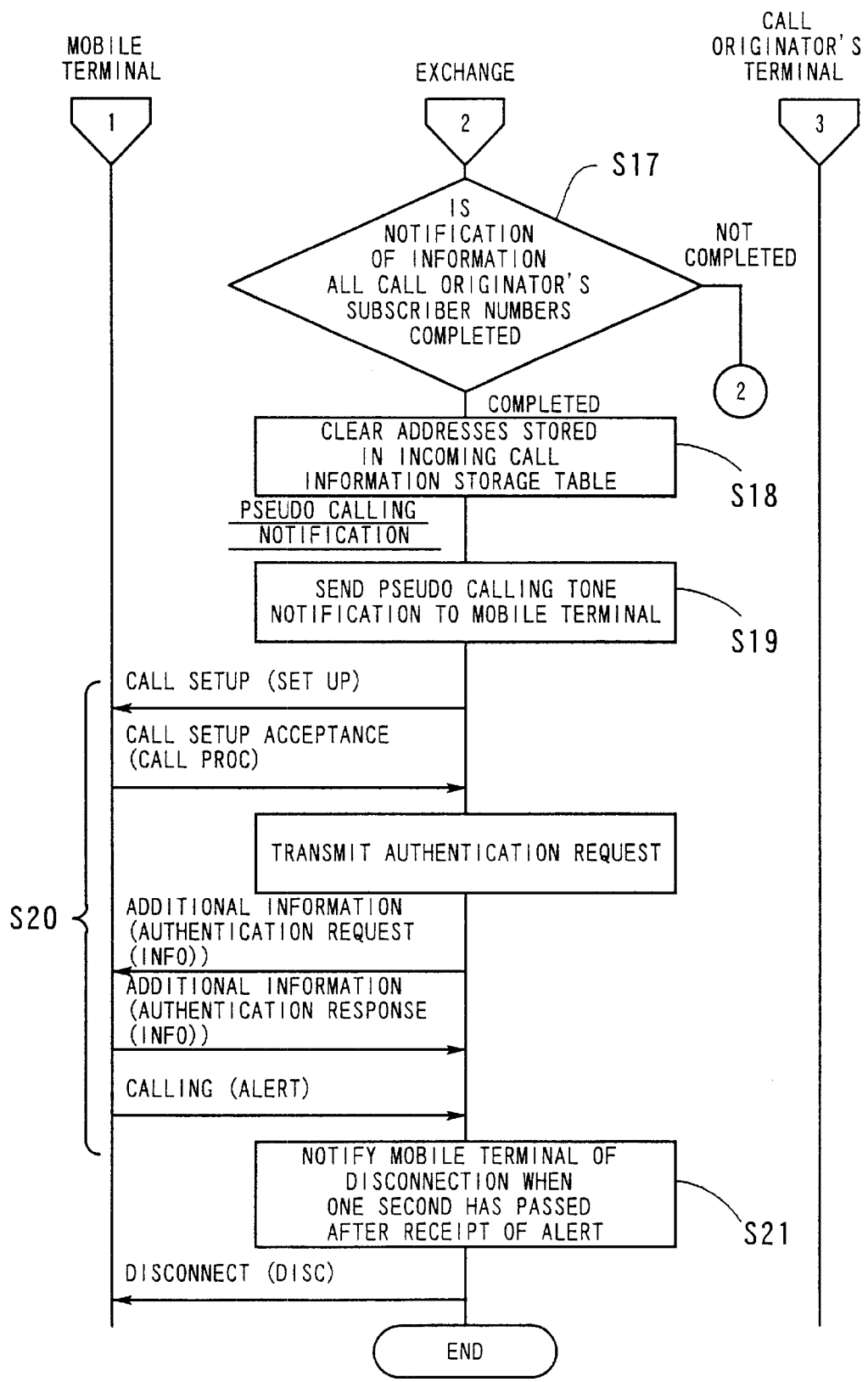
FIG. 8 is a sequence diagram showing a second half of the process for pseudo calling notification and pseudo calling tone notification, according to the first embodiment.

FIGS. 7 and 8 shows a process for pseudo calling notification and pseudo calling tone notification, according to the first embodiment. FIG. 7 shows the first half of the sequence, while FIG. 8 shows the second half of the same.

Now, let it be assumed that the communication is over and that the mobile terminal 20 is capable of accepting an incoming call. The terminal status management control section 11b stores the status information of the mobile terminal 20 as "call-acceptable" in a field of the terminal status storage table 12a associated with the terminal 20.

The pseudo incoming call control section 11d monitors the terminal status storage table 12a periodically so as to check whether or not the mobile terminal 20 is capable of accepting a call (S11). When the mobile terminal 20 is capable of accepting a call, the pseudo incoming call control section 11d searches the incoming call information storage table 12b to determine whether or not an incoming call was made when the terminal 20 was not capable of accepting a call (S12). If the incoming call information (* 2000) associated with the mobile terminal 20 is stored in the incoming call information storage table 12b, the pseudo incoming call control section 11d reads out the information and sends a pseudo incoming call to the terminal 20 (S14).

Figure 9A:
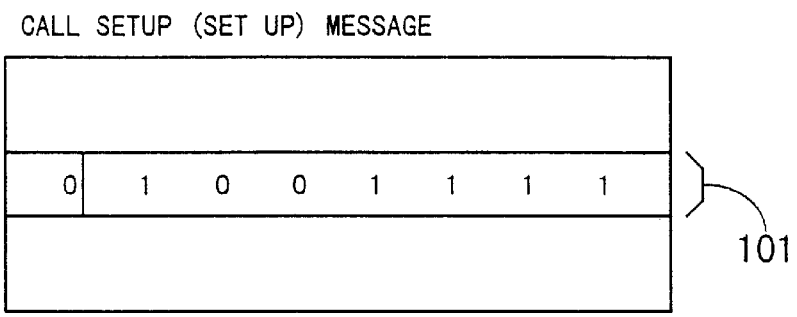
FIG. 9(A) is a diagram showing a format of a call setup (SET UP) message having entry of a value representative of a ringing/vibration-Off signal.
Figure 9B:
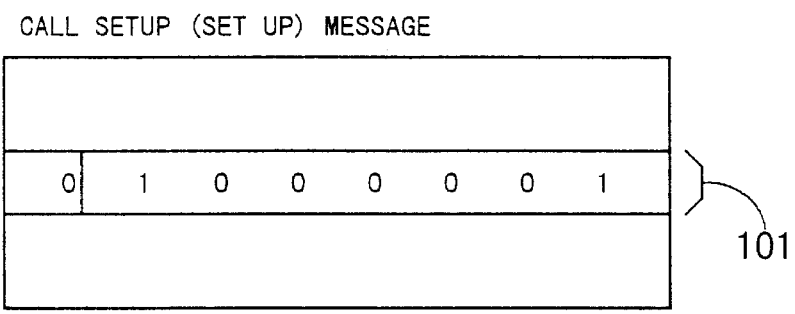
FIG. 9(B) is a diagram showing a format of the call setup (SET UP) message having entry of a value representative of a ringing/vibration-on signal.

More specifically, a value "1001111" representative of a ringing/vibration-Off signal is written in a "signal information element" field 101 of a call setup (SET UP) message shown in FIG. 9(A). A value representative of a ringing/vibration-on signal is represented by "1000001" as shown in FIG. 9(B). A ringing/vibration-on signal instructs generation of a calling (SET UP) tone notifying a terminal operator of receipt of a call. Some apparatuss use vibration instead of a calling tone. Further, the incoming call information (* 2000), not shown in FIGS. 9(A) and 9(B), is also inserted in the call setup message.

Referring again to FIG. 7, the call setup (SET UP) message is thus transmitted to the mobile terminal 20 from the pseudo incoming call control section 11d, whereby a sequence of operations for pseudo incoming call processing are carried out between the pseudo incoming call control section 11d and the mobile terminal 20 (S15). The mobile terminal 20 makes no ringing/vibration in response to the ringing/vibration-off signal entered in the call setup message, but writes the incoming call information (* 2000) in its memory.

Since this incoming call is a pseudo one, the pseudo incoming call control section 11d notifies the mobile terminal 20 of disconnection (DISC) to carry out incoming call abortion processing immediately after receipt of an alert (ALERT) from the terminal 20 (S16).

Referring to FIG. 8, once the whole incoming call information associated with the mobile terminal 20 which is stored in the incoming call information storage table 12b is transmitted to the terminal 20 through the pseudo incoming call processing (S17), it is deleted from the table 12b (S18).

Next, the pseudo calling tone control section 11e sends the pseudo calling tone notification to the mobile terminal 20 (S19).

More specifically, the pseudo calling tone control section 11e writes the value "1000001" representative of the ringing/vibration-on signal in the "signal information element" field 101 of the call setup message, and then transmits the call setup (SET UP) message to the mobile terminal 20, whereby another sequence of operations for the pseudo incoming call processing are carried out between the pseudo calling tone control section 11e and the terminal 20 (S20). The mobile terminal 20 carries out ringing/vibration in response to the ringing/vibration-on signal written in the call setup message. However, since this incoming call is a pseudo one, the pseudo calling tone control section 11e notifies the mobile terminal 20 of disconnection (DISC) when a predetermined time period (e.g. one second) has elapsed after receipt of an alert therefrom (S21).

Thus, it is possible to notify the operator of the mobile terminal 20 that an incoming call was received when the terminal 20 was in use.

Figure 10:
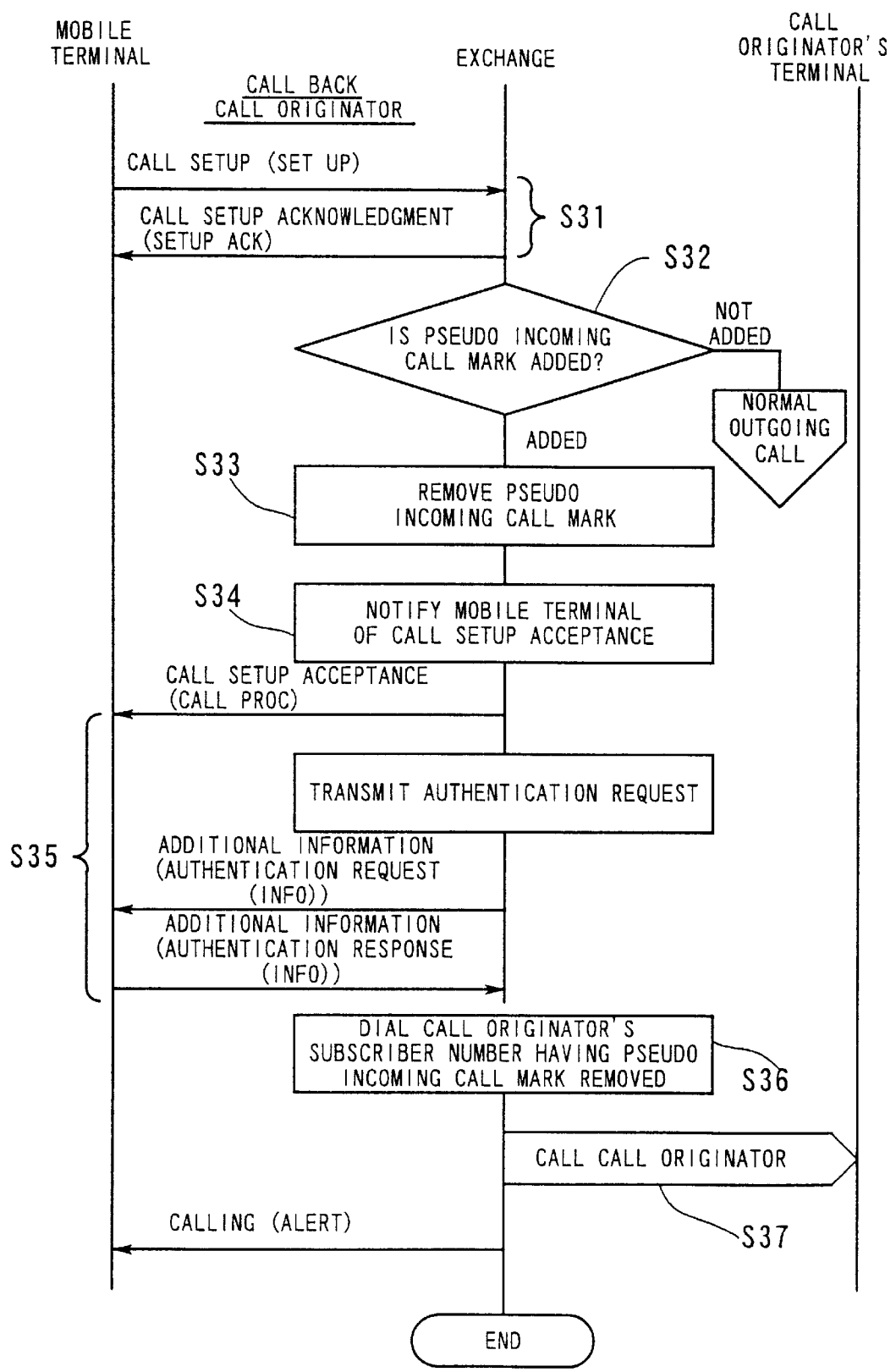
FIG. 10 is a sequence diagram showing a process for calling back to a call originator based on the pseudo calling notification, according to the first embodiment.

FIG. 10 shows a process for calling back to the call originator based on the pseudo calling notification, according to the first embodiment.

The operator of the mobile terminal 20 notified of the incoming call received when the terminal 20 was in use depresses a search button provided on the terminal 20, whereby the call originator's subscriber number stored in the memory of the terminal 20 is displayed on a display of the terminal 20. Further, by depressing a call button, the incoming call information (* 2000) stored in the memory is inserted into the call setup message and delivered to the private branch exchange 10 (S31).

The outgoing call control section 11f of the private branch exchange 10 extracts the incoming call information (* 2000) from the call setup message sent from the mobile terminal 20, removes the pseudo incoming call mark "*" to obtain the call originator's subscriber number (2000) alone (S32, S33) and notify the mobile terminal 20 of call setup acceptance (S34). Then, the outgoing call control section 11f executes a sequence of operations for the call setup processing (S35 to S37), which establishes communication between the mobile terminal 20 and the multi-function telephone set (call originator's terminal) 41 having the call originator's subscriber number (2000).

Although the ringing/vibration is carried out over a predetermined time period at the step S21 in FIG. 8, this is not limitative, but the ringing/vibration may be inhibited.

Next, a second embodiment of the present invention will be described. The second embodiment has basically the same construction as that of the first embodiment. Therefore, detailed description of the construction will be omitted.

In the second embodiment, a private branch exchange 10 performs further operations in addition to those performed by the exchange 10 according to the first embodiment.

Figure 11:
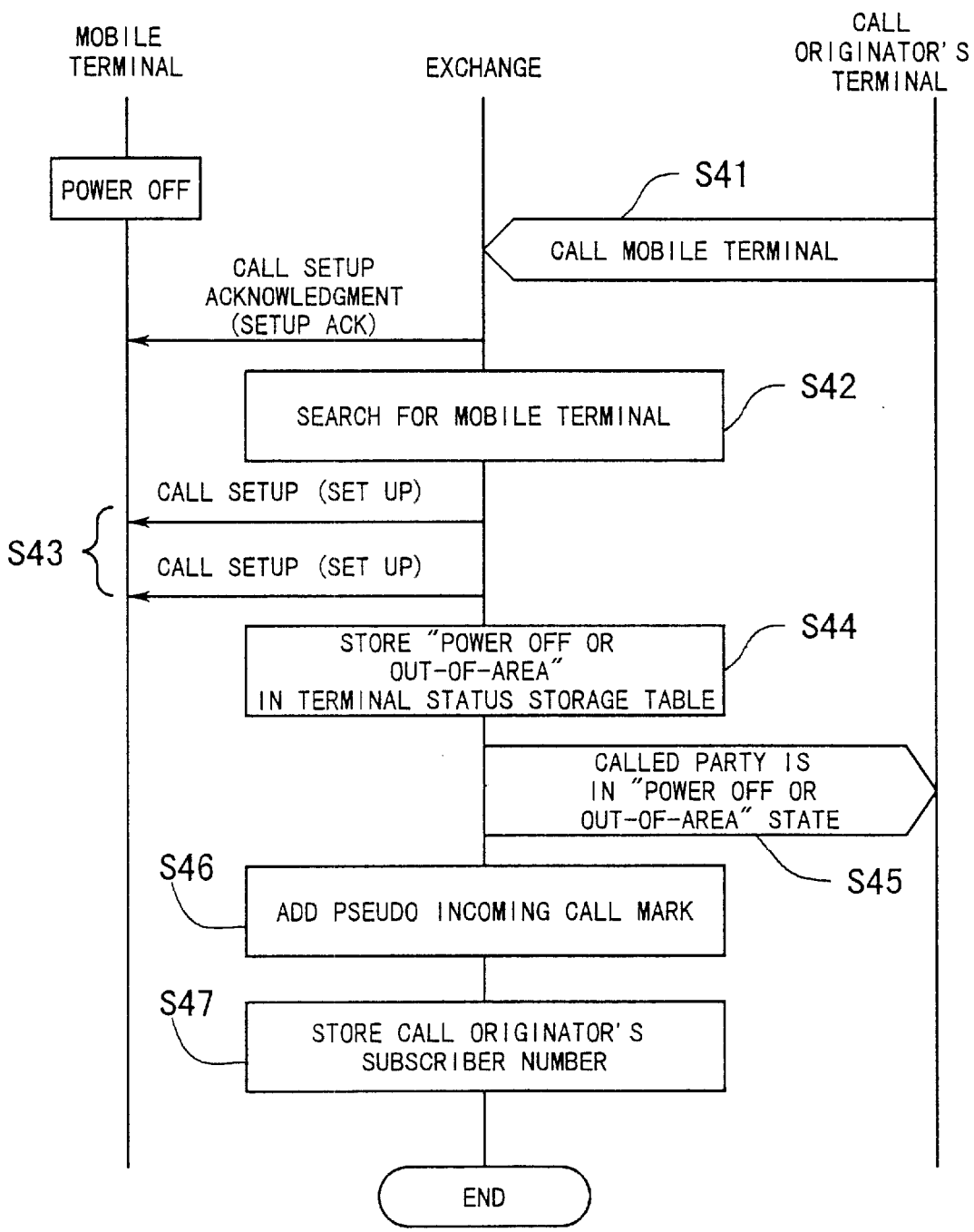
FIG. 11 is a sequence diagram showing operations performed by a private branch exchange of an incoming call notification apparatus according to a second embodiment of the present invention when the power of a mobile terminal is in the OFF state.

FIG. 11 shows a sequence of operations performed by the private branch exchange 10 of the second embodiment. In the FIG. 11 sequence, information of a call originator's subscriber number is stored.

Now, let it be assumed that the power of a mobile terminal 20 is in the OFF state.

When a multi-function telephone set (call originator's terminal) 41 makes a call to the mobile terminal 20 (S41), an incoming call control section 11c of the private branch exchange 10 searches for a field of a terminal status storage table 12a associated with the mobile terminal 20 to check on the present status of the terminal 20. If "call-acceptable" is written in this field of the table 12a, the incoming call control section 11c sends a call setup message to the mobile terminal 20 and waits for an answer from the terminal 20 (S42, S43). If there is no answer from the terminal 20, the incoming call control section 11c judges that the power of the terminal 20 is in the OFF state or that the terminal 20 is outside a service area therefor. Then, the incoming call control section 11c writes "power off or out-of-area" in the field of the terminal status storage table 12a associated with the terminal 20, and notifies the multi-function telephone set 41 of the present status of the terminal 20 as "power off or out-of-area"(S44, S45).

Next, the incoming call control section 11c adds a pseudo incoming call mark "*" to the call originator's subscriber number 2000 to produce incoming call information (S46), and stores the information in an incoming call information storage table 12b.

Figure 12:
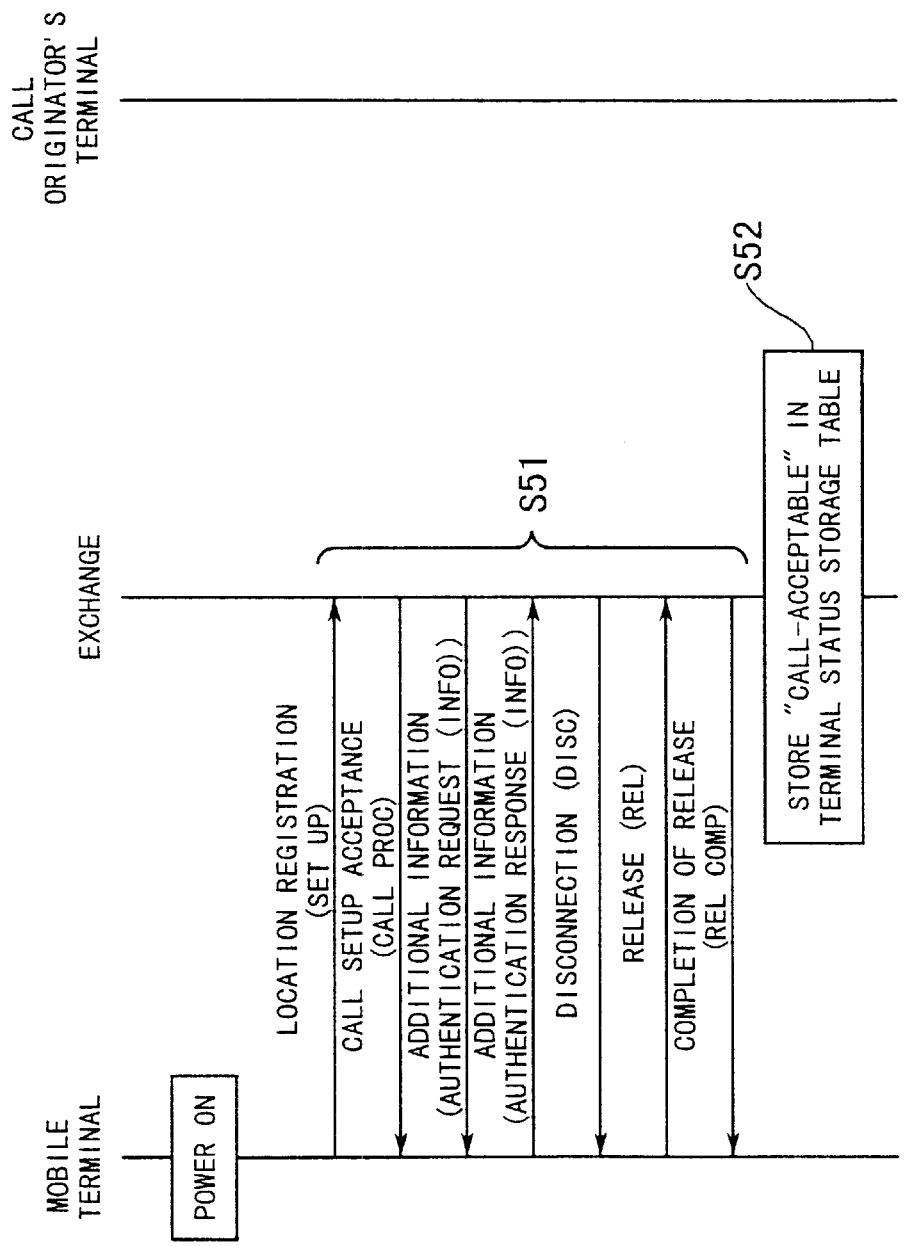

FIG. 12 shows a sequence of operations performed by the private branch exchange 10 when the power of the mobile terminal 20 is turned on after execution of the FIG. 11 process.

When the power of the mobile terminal 20 is turned on, the terminal 20 transmits a location registration request (SET UP) to a location registration control section 11g of the private branch exchange 10, whereby a sequence of operations for location registration processing are carried out between the terminal 20 and the exchange 10 (S51).

When the location registration control section 11g is notified of completion of release(REL COMP), "call-acceptable" is written in the field of the terminal status storage table 12a associated with the terminal 20 (S52).

Thereafter, sequences of processing operations identical with those shown in FIGS. 7, 8, and 10 according to the first embodiment are executed.

Thus, a pseudo incoming call is delivered to the mobile terminal 20, and incoming call information is displayed on a display of the terminal 20. Therefore, the operator of the terminal 20 is informed, immediately after the power is turned on, that the incoming call was received when the power was in the OFF state.

Also, even when an incoming call was received when the mobile terminal 20 was outside a service area therefor, the operator of the mobile terminal can receive incoming call notification immediately after the terminal 20 returns to the service area.

Next, a third embodiment of the present invention will be described. The third embodiment basically has the same construction as that of the first embodiment. Therefore, components corresponding to those of the first embodiment are indicated by identical reference numerals, and detailed description thereof will be omitted.

Figure 13:
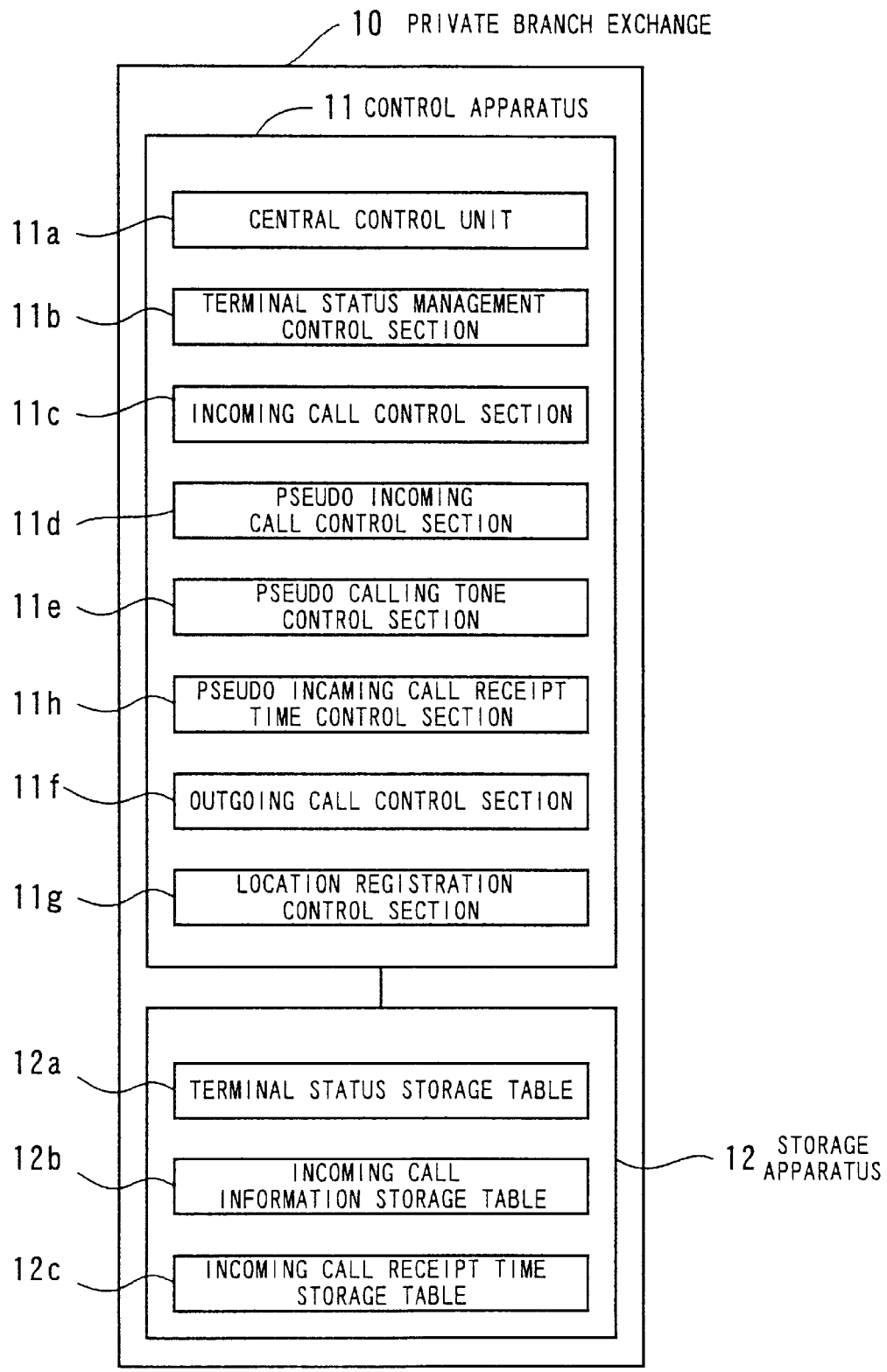
FIG. 13 is a block diagram schematically showing an internal construction of a private branch exchange of an incoming call notification apparatus according to a third embodiment of the present invention.

FIG. 13 shows the internal construction of a private branch exchange 10 according to the third embodiment. The third embodiment is distinguished from the above embodiments in that a control apparatus 11 is provided with a pseudo incoming call receipt time control section 11h and further, a storage apparatus 12 is provided with an incoming call receipt time storage table 12c. When the exchange 10 receives a call directed to a mobile terminal in a call-not-acceptable state, the pseudo incoming call receipt time control section 11h obtains the call receipt time from a clock 50 to store the same in the incoming call receipt time storage table 12c. The section 11h also performs an operation for reading out the receipt time from the table 12c.

Figure 14:
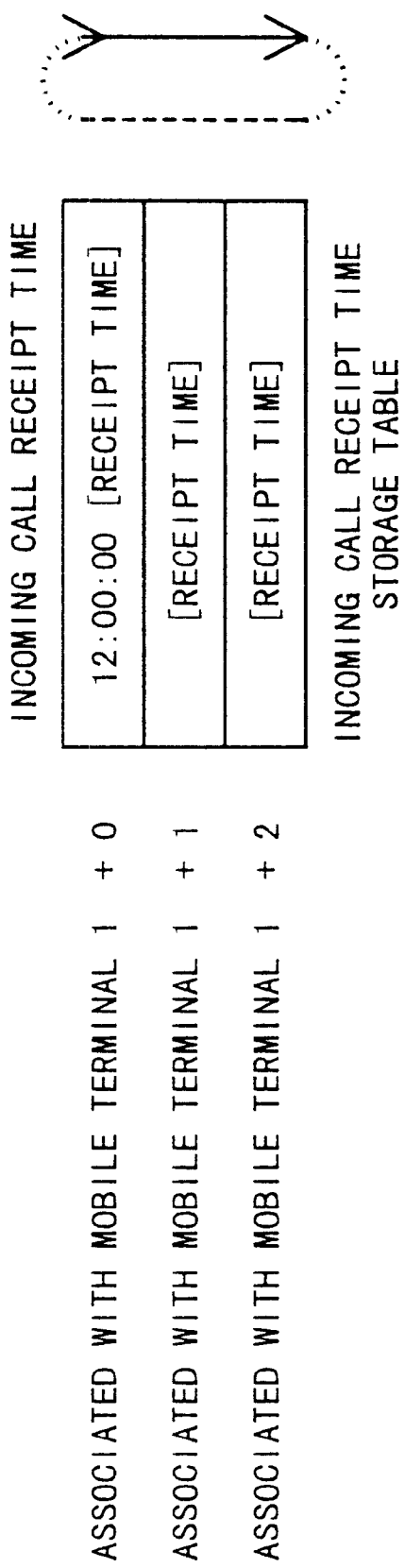
FIG. 14 is a diagram showing an example of contents stored in an incoming call receipt time storage table.

FIG. 14 shows an example of contents stored in the incoming call receipt time storage table 12c. In the illustrated example, three incoming call receipt times are stored in a circulating manner for each mobile terminal (the number of records provided for each mobile terminal in the table held by the exchange is equal to the maximum number of records of a corresponding table provided in the mobile terminal). This storage processing is carried out while correlating the stored time information to the incoming call information item stored in the incoming call information storage table 12b.

According to the third embodiment, a sequence of operations different from a corresponding one of the first embodiment shown in FIG. 10 is carried out.

Figure 15:
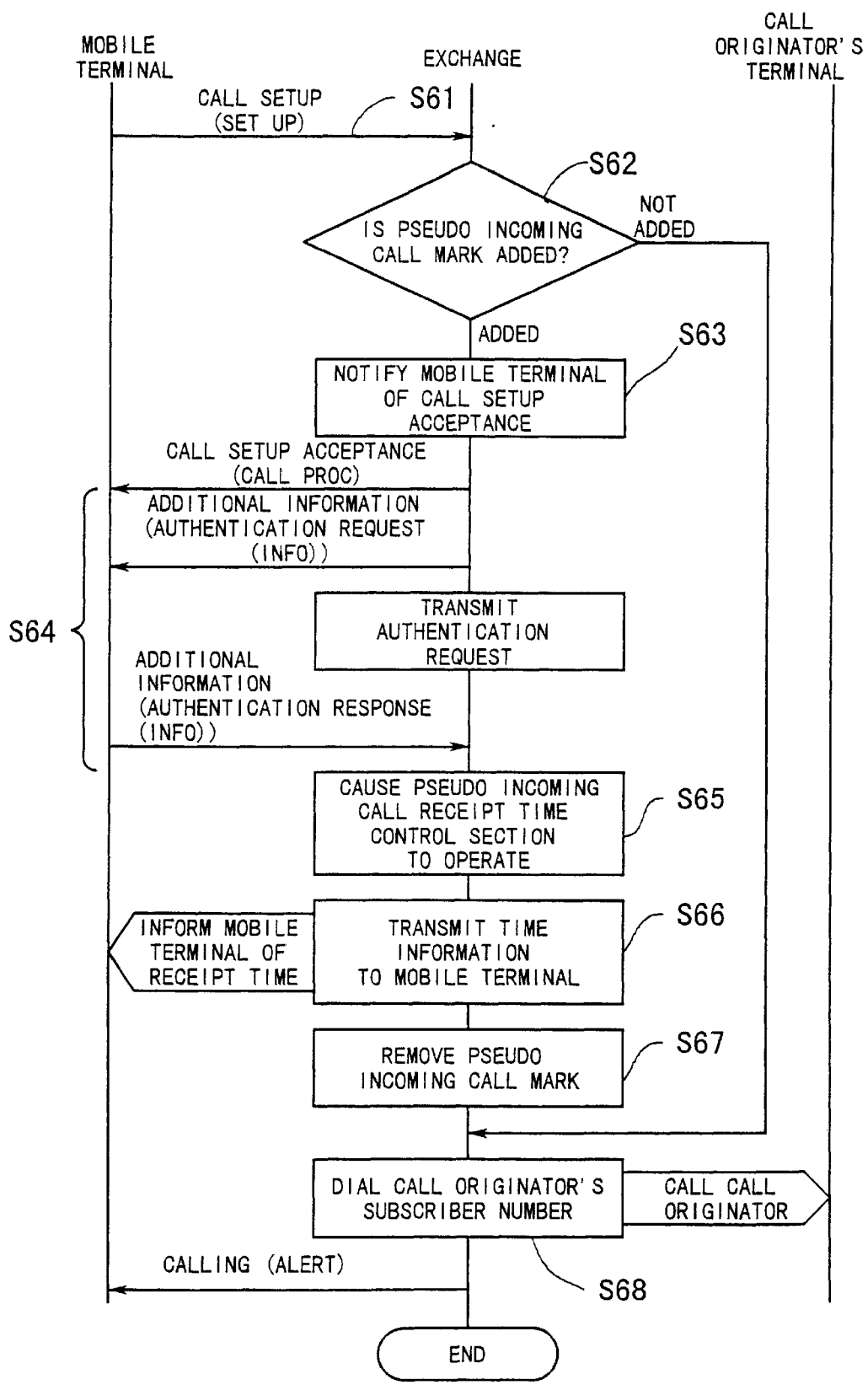
FIG. 15 is a sequence diagram showing a process for calling back to a call originator, according to the third embodiment.

FIG. 15 shows the sequence of processing operations for calling back to a call originator, according to the third embodiment. When notified that an incoming call was received during communication with another party, the operator of the mobile terminal 20 depresses a search button provided on the terminal 20, whereby the call originator's subscriber number stored in a memory of the terminal 20 is displayed on a display of the terminal 20. Further, by depressing a call button, incoming call information (* 2000) stored in the memory is inserted into a call setup message and sent to the private branch exchange 10 (S61).

An outgoing call control section 11f of the private branch exchange 10 extracts the incoming call information (* 2000) from the call setup message sent from the mobile terminal 20 and check whether or not the incoming call information has a pseudo incoming call mark "*" added thereto (S62). If the incoming call information has the pseudo incoming call mark "*" added thereto, the section 11f notifies the mobile terminal 20 of call setup acceptance (CALL PROC) and carries out a sequence of operations for call setup processing (S63, S64).

Then, the outgoing call control section 11f of the private branch exchange 10 causes the pseudo incoming call receipt time control section 11h to operate (S65). The section 11h searches the incoming call receipt time storage table 12c to read out an incoming call receipt time associated with the mobile terminal 20 and correlated to the incoming call information, and informs the terminal 20 of the incoming call receipt time by voice transmission (S66). Thus, the operator of the mobile terminal 20 can get voice information of the incoming call receipt time corresponding to the incoming call information (* 2000) transmitted to the exchange 10 when the call button was depressed.

Thereafter, the outgoing call control section 11f removes the pseudo incoming call mark "*" from the incoming call information ( * 2000), and then dials the call originator's subscriber number (2000) (S67, S68), thereby enabling communication between the mobile terminal 20 and the multi-function telephone set (call originator's terminal) 41 having the call originator's subscriber number (2000)

Although in the above first to third embodiments, description is made of incoming call notification concerning an incoming call directed to a mobile terminal, the present invention can also be applied to a case in which a call is directed to a fixed terminal.

Further, although in each of the above embodiments, the incoming call notification apparatus according to the present invention is provided in the private branch exchange 10, this is not limitative, but it can be provided in a typical exchange, as wll.

As described above, according to the present invention, an exchange stores information of a call received when a called terminal is incapable of accepting a call, and sends the information to the terminal when the terminal has become capable of accepting a call. Therefore, even when a call is sent to the terminal in a call-not-acceptable state, the operator of the terminal can get informed of the call originator afterward.

Further, the incoming call notification apparatus of the present invention enables notification of call receipt without changing the construction of each terminal. That is, it is simply required to modify an exchange, to utilize the apparatus according to the invention, sot that it is easy to provide incoming call notification service realized by the present invention.

Moreover, the apparatus of the invention can be provided not only in a private branch exchange but also in an exchange for use in a public communication network.

Still further, the operator of a called terminal is notified of an incoming call received in the call-not-acceptable state when the terminal becomes capable of accepting a call and at the same time the call originator's subscriber number is displayed on the display of the terminal, whereupon the operator can immediately call back to the call originator simply by depressing the call button of the terminal.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. An incoming call notification apparatus for use in a telephone system, comprising:
    incoming call information storage means for storing incoming call information of an incoming call received when a called terminal is in a call-not-acceptable state, the incoming call information serving to notify the called terminal of a receipt of the incoming call which could not reach the called terminal;
    call setup message transmission means for reading out said incoming call information stored in said incoming call information storage means, producing a call setup message containing said incoming call information read out, and transmitting said call setup message in the sequence of an incoming call process to said called terminal in response to said called terminal changing from said call-not-acceptable state to a call-acceptable state; and
    disconnect means for carrying out incoming call information abortion processing after execution of calling without a call establishment to leave said incoming call information in a memory of said called terminal.

2. An incoming call notification apparatus according to claim 1, wherein said call-not-acceptable state of said called terminal is a state in which said terminal is in use, in a power-off state, or out of a service area therefor.

3. An incoming call notification apparatus according to claim 1, wherein said incoming call information contains at least a call originator's subscriber number.

4. A incoming call notification apparatus according to claim 1, wherein said call setup message transmission means produces said call setup message in a manner such that said message contains a signal for inhibiting a means for notifying a terminal operator of receipt of an incoming call from operating in response to said call setup message.

5. An incoming call notification apparatus according to claim 1, wherein said call setup message transmission means produces said call setup message in a manner such that said message contains a signal for causing a means for notifying a terminal operator of receipt of an incoming call to operate in response to said call setup message, and
    said disconnect means carries out said incoming call abortion processing when a predetermined time period has elapsed after execution of said calling.

6. An incoming call notification apparatus according to claim 1, wherein said telephone system is a mobile telephone system.

7. An incoming call notification apparatus according to claim 1, wherein said call setup message transmission means further includes addition means for adding a pseudo incoming call mark indicative of falseness of a pseudo incoming call to said incoming call information read out from said incoming call information storage means and then producing said call setup message, and
    the incoming call notification apparatus further including call transmission means for removing said pseudo incoming call mark added to said incoming call information and then executing call transmission processing when an outgoing call is transmitted from said called terminal based on said incoming call information.

8. incoming call notification apparatus according to claim 1, further including:
    incoming call receipt time storage means for storing call receipt date and time while correlating said call receipt date and time to said incoming call information of said incoming call when said incoming information storage means stores said incoming call information, and
    time notification means for reading out said call receipt date and time corresponding to said incoming call information from said incoming call receipt time storage means and notifying an operator of a called terminal of said call receipt date and time, when an outgoing call is transmitted from said called terminal based on said incoming call information.

9. A method of providing incoming call information to a called terminal in a telephone system, the incoming call information including information that an incoming call was received while the called terminal was in a call-not-acceptable state, the method of providing incoming information comprising the steps of:
    storing the incoming call information of the incoming call received when the called terminal is in the call-not-acceptable state, the incoming call information serving to notify the called terminal of a receipt of the incoming call which could not reach the called terminal;
    reading out the stored incoming call information;
    producing a call setup message containing the read out incoming call information;
    transmitting the call setup message in the sequence of an incoming call process to the called terminal in response to the called terminal changing from the call-not-acceptable state to a call-acceptable state; and executing abortion processing of the incoming call information after the transmitting step without a call establishment to leave said incoming call information in a memory of said called terminal.

10. The method of claim 9, wherein the call-not-acceptable state of the called terminal is a state in which the terminal is in use, in a power-off state, or out of a service area therefor.

11. The method of claim 9, wherein the incoming call information contains at least a call originator's subscriber number.

12. The method of claim 9, wherein the producing step further includes producing the call setup message in a manner such that the message contains a signal for inhibiting the notification of a terminal operator of receipt of an incoming call in response to the call setup message.

13. The method of claim 9, where in the producing step further includes producing the call setup message in a manner such that the message contains a signal for notifying a terminal operator of receipt of an incoming call in response to said call setup message, and the executing abortion processing step further includes executing the incoming call information abortion processing when a predetermined time period has elapsed after the transmitting step.

14. The method of claim 9, wherein said telephone system is a mobile telephone system.

15. The method of claim 9, further including the steps of:

adding a pseudo incoming call mark indicative of falseness of a pseudo incoming call, to the read out incoming call information and then producing said call setup message, and removing the pseudo incoming call mark added to the incoming call information and then executing call transmission processing when an outgoing call is transmitted from the called terminal based on the incoming call information.

16. The method of claim 9, further including the steps of:

storing call receipt date and time while correlating the call receipt date and time to the incoming call information of the incoming call when the incoming call information is being stored, and reading out the call receipt date and time corresponding to the incoming call information and notifying an operator of a called terminal of the call receipt date and time when an outgoing call is transmitted from the called terminal based on the incoming call information.

* * * * *